US008769936B2

(12) United States Patent
Petrovic et al.

(10) Patent No.: US 8,769,936 B2
(45) Date of Patent: Jul. 8, 2014

(54) METHOD FOR MONITORING A REGULATED EMISSION CONCENTRATION IN THE EXHAUST GAS OF AN INTERNAL COMBUSTION ENGINE

(75) Inventors: Simon Petrovic, Aachen (DE); Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 13/276,020

(22) Filed: Oct. 18, 2011

(65) Prior Publication Data

US 2012/0102943 A1 May 3, 2012

(30) Foreign Application Priority Data

Nov. 3, 2010 (DE) .......................... 10 2010 060 330

(51) Int. Cl.
*F01N 3/00* (2006.01)
*F01N 3/02* (2006.01)
*F01N 3/20* (2006.01)

(52) U.S. Cl.
USPC .................. 60/287; 60/276; 60/277; 60/280; 60/286; 60/295

(58) Field of Classification Search
USPC ..................... 60/277, 280, 286, 295, 287, 288
See application file for complete search history.

(56) References Cited

U.S. PATENT DOCUMENTS

| 5,157,921 | A | * | 10/1992 | Ito et al. ........................... 60/274 |
| 5,703,777 | A | * | 12/1997 | Buchhop et al. .............. 701/109 |
| 7,676,318 | B2 | | 3/2010 | Allain |
| 2002/0112469 | A1 | * | 8/2002 | Kanazawa et al. .............. 60/285 |
| 2008/0149081 | A1 | * | 6/2008 | Allain ....................... 123/568.21 |

FOREIGN PATENT DOCUMENTS

| DE | 10142198 B4 | 2/2008 |
| DE | 102007061468 A1 | 7/2008 |
| DE | 102007030233 A1 | 1/2009 |

OTHER PUBLICATIONS

Partial Translation of BOSCH, Kraftfahrtechnisches Taschenbuch, 25 Auflage, Friedr. Vieweg & Sohn Verlag: Wiesbaden, 2003, p. 133.

* cited by examiner

*Primary Examiner* — Kenneth Bomberg
*Assistant Examiner* — Dapinder Singh
(74) *Attorney, Agent, or Firm* — Julia Voutyras; Alleman Hall McCoy Russell & Tuttle LLP

(57) ABSTRACT

A method for monitoring a regulated emissions concentration $C_i$ in the exhaust gas of an internal combustion engine is provided. The method comprises directing the exhaust gas through an exhaust-gas turbocharger, directing at least a portion of the exhaust gas through an exhaust-gas recirculation system, measuring an air ratio $\lambda_{meas}$ in the exhaust gas with a lambda probe, measuring a rotational speed $n_T$ of the exhaust-gas turbocharger with a sensor, and determining the regulated emission concentration $C_i$ based on the air ratio $\lambda_{meas}$ and the rotational speed $n_T$. In this way, the emission concentration of the exhaust may be determined as a function of the rotational speed of the turbine.

20 Claims, 4 Drawing Sheets

METHOD FOR MONITORING A REGULATED EMISSION CONCENTRATION IN THE EXHAUST GAS OF AN INTERNAL COMBUSTION ENGINE

RELATED APPLICATIONS

The present application claims priority to German Patent Application No. 102010060330.9, filed on Nov. 3, 2010, the entire contents of which are hereby incorporated by reference for all purposes.

FIELD

The disclosure relates to a method for monitoring a regulated emission concentration $C_i$ in the exhaust gas of an internal combustion engine.

BACKGROUND AND SUMMARY

Engine-out exhaust frequently includes byproducts of combustion that may be detrimental to the environment, and as such are subject to emission regulation. To reduce these so-called regulated emissions, internal combustion engines are frequently equipped with various exhaust-gas aftertreatment systems. For the oxidation of unburned hydrocarbons (HC) and carbon monoxide (CO), an oxidation catalytic converter is often provided in the exhaust-gas discharge system, in particular in the case of internal combustion engines which are operated with an excess of air, for example spark-ignition engines which operate in a lean-burn mode or direct-injection diesel engines.

In the case of spark-ignition engines, use may also be made of three-way catalytic converters, which however provide optimal conversion at stoichiometric operation ($\lambda \approx 1$) within narrow limits. Here, the nitrogen oxides NOx are reduced by the non-oxidized exhaust-gas components which are present, specifically the carbon monoxides and the unburned hydrocarbons, wherein said emissions are oxidized at the same time.

With an excess of air ($\lambda \gg 1$), the nitrogen oxides in the exhaust gas cannot be reduced out of principle, that is to say on account of the lack of reducing agent. To reduce the nitrogen oxides, use is therefore made of selective catalytic converters—so-called SCR catalytic converters—in which reducing agent is purposely introduced into the exhaust gas in order to selectively reduce the nitrogen oxides. As reducing agent, in addition to ammonia and urea, use may also be made of unburned hydrocarbons. The latter is also referred to as HC enrichment, with the unburned hydrocarbons being introduced directly into the exhaust-gas discharge system or else by engine-internal measures, for example by a post-injection of additional fuel.

The nitrogen oxide emissions may also be reduced by a so-called nitrogen oxide storage catalytic converter (LNT— Lean NO$_x$ Trap). Here, the nitrogen oxides are initially— during a lean-burn mode of the internal combustion engine— absorbed, that is to say collected and stored, in the catalytic converter before being reduced during a regeneration phase, for example, by substoichiometric operation (for example $\lambda < 0.95$) of the internal combustion engine with a lack of oxygen. During the regeneration phase, the nitrogen oxides NO are released and converted substantially into nitrogen dioxide ($N_2$), carbon dioxide ($CO_2$) and water ($H_2O$).

To minimize the emissions of soot particles, use is made of so-called regenerative particle filters which filter the soot particles out of the exhaust gas and store them, with said soot particles being burned off intermittently during the course of the regeneration of the filter.

One difficulty with the use of an LNT results from the sulfur contained in the exhaust gas, which is likewise absorbed in the LNT. The high temperatures used for a desulfurization can damage the storage catalytic converter, contribute to thermal aging of the catalytic converter and adversely affect the desired conversion of the nitrogen oxides. The storage capacity of the LNT, that is to say the capability thereof to store nitrogen oxides, decreases with advancing operating duration.

The high exhaust-gas temperatures lead to thermal aging and, with advancing operating duration, to a restriction of functionality, that is to say a decrease in conversion rates, not only in the case of a storage catalytic converter but also in the case of an oxidation catalytic converter. In particular, the high temperatures used for the oxidation of methane have proven to be critical.

On account of the fact that the efficiency of an exhaust-gas aftertreatment system decreases with advancing operating duration or an exhaust-gas aftertreatment system can basically also be irreversibly damaged, an exhaust-gas aftertreatment system or the functionality of such a system may be monitored in order to prevent undesirably high emissions as a result of restricted functionality or lack of conversion. Even though the present regulations do not imperatively require on-board diagnosis (OBD), future concepts may necessitate this. For example, the EURO VI regulation prescribes the monitoring of nitrogen oxide untreated emissions.

One engine-internal measure for the reduction of nitrogen oxide emissions includes exhaust-gas recirculation, that is to say the recirculation of exhaust gases from the exhaust-gas discharge system into the intake system via a recirculation line.

Exhaust-gas recirculation is a concept for reducing nitrogen oxide emissions, wherein the nitrogen oxide emissions can be reduced considerably with increasing exhaust-gas recirculation rate. Here, the exhaust-gas recirculation rate $x_{EGR}$ is determined as follows:

$$x_{EGR} = m_{EGR}/(m_{EGR} + m_{Fresh\ air})$$

where $m_{EGR}$ denotes the mass of recirculated exhaust gas and $m_{Fresh\ air}$ denotes the supplied fresh air, that is to say combustion air, which has if appropriate been delivered and compressed by means of a compressor.

Exhaust-gas recirculation is also suitable for reducing the emissions of unburned hydrocarbons in the part-load range. To obtain a considerable reduction in nitrogen oxide emissions, high exhaust-gas recirculation rates may be used, such as of the order of magnitude of $x_{EGR} \approx 60\%$ to 70%.

In the case of internal combustion engines which are supercharged by exhaust-gas turbocharging and which are equipped with an exhaust-gas recirculation system, this results in a conflict because the recirculated exhaust gas is generally extracted from the exhaust-gas discharge system upstream of the turbine of the at least one exhaust-gas turbocharger and is no longer available for driving the at least one turbine.

In an exhaust-gas turbocharger, a compressor and a turbine are arranged on the same shaft, with the hot exhaust-gas flow being supplied to the turbine and expanding in said turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the internal combustion engine is obtained.

In the event of an increase in the exhaust-gas recirculation rate, the exhaust-gas flow conducted through the turbine decreases. The reduced exhaust-gas flow through the turbine leads to a lower turbine pressure ratio, with which the charge pressure ratio also falls, which is equivalent to a smaller compressor mass flow.

The described effects, that is to say both the increase in the exhaust-gas recirculation and also the simultaneous decrease in the charge pressure caused by this, lead to a richer cylinder fresh charge, that is to say to less fresh air or oxygen in the combustion chamber, which has a significant influence on the formation on the emissions and the emission concentrations in the exhaust-gas discharge system.

The inventors have recognized the issues with the above approaches and offer a method herein to at least partly address them. A method for monitoring a regulated emission concentration $C_i$ in the exhaust gas of an internal combustion engine is provided. The method comprises directing the exhaust gas through an exhaust-gas turbocharger, directing at least a portion of the exhaust gas through an exhaust-gas recirculation system, measuring an air ratio $\lambda_{meas}$ in the exhaust gas with a lambda probe, measuring a rotational speed $n_T$ of the exhaust-gas turbocharger with a sensor, and determining the emission concentration $C_i$ based on the air ratio $\lambda_{meas}$ and the rotational speed $n_T$.

In this way, an emission concentration C, in the exhaust gas of the internal combustion engine can be more accurately determined by taking into account the reduction in mass flow of the exhaust brought about by the EGR system. By doing so, a more inexpensive sensor can be utilized with a more robust determination of the emission concentration of the exhaust.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
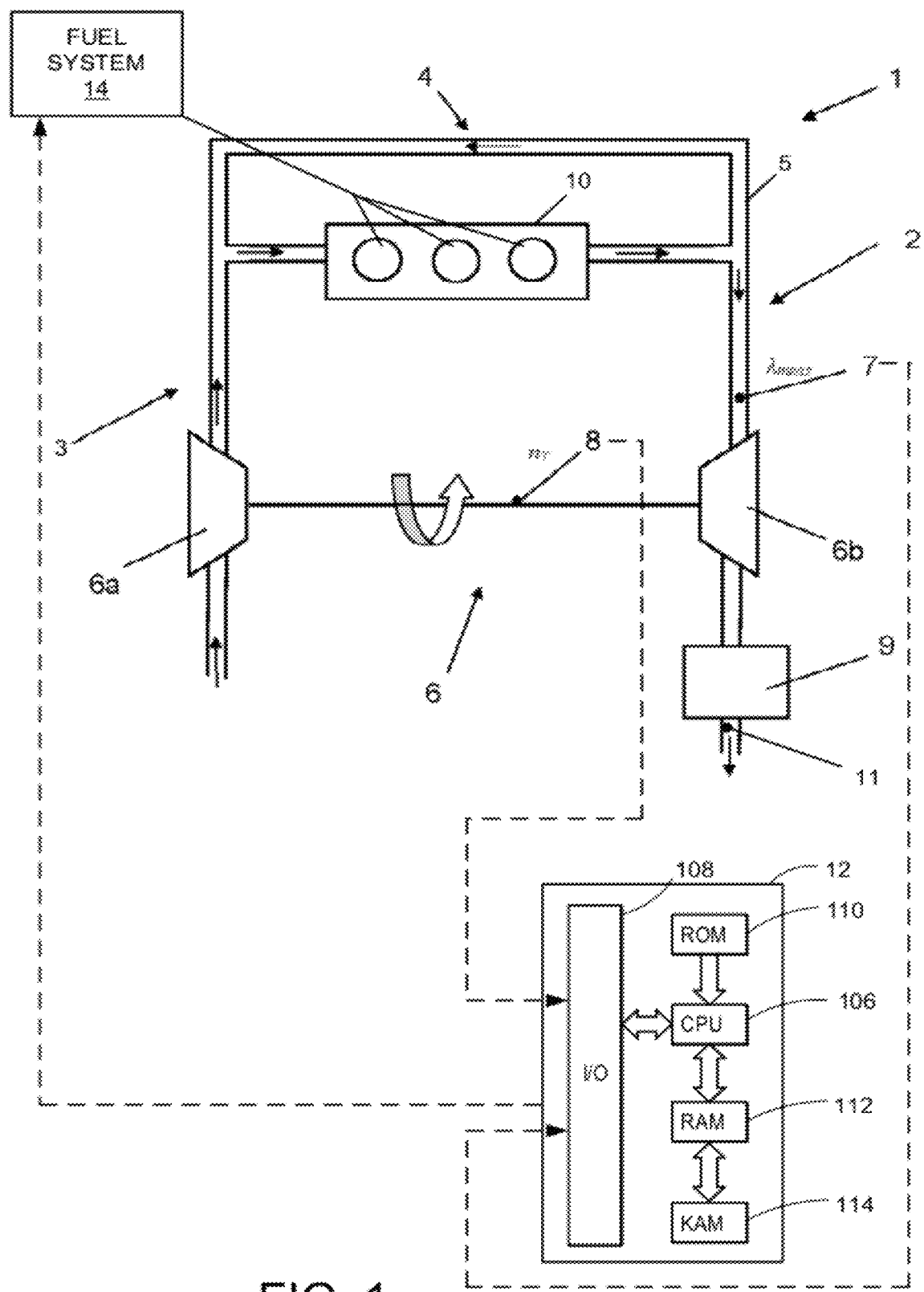
FIG. 1 schematically shows an embodiment of an internal combustion engine.
Figure 2:
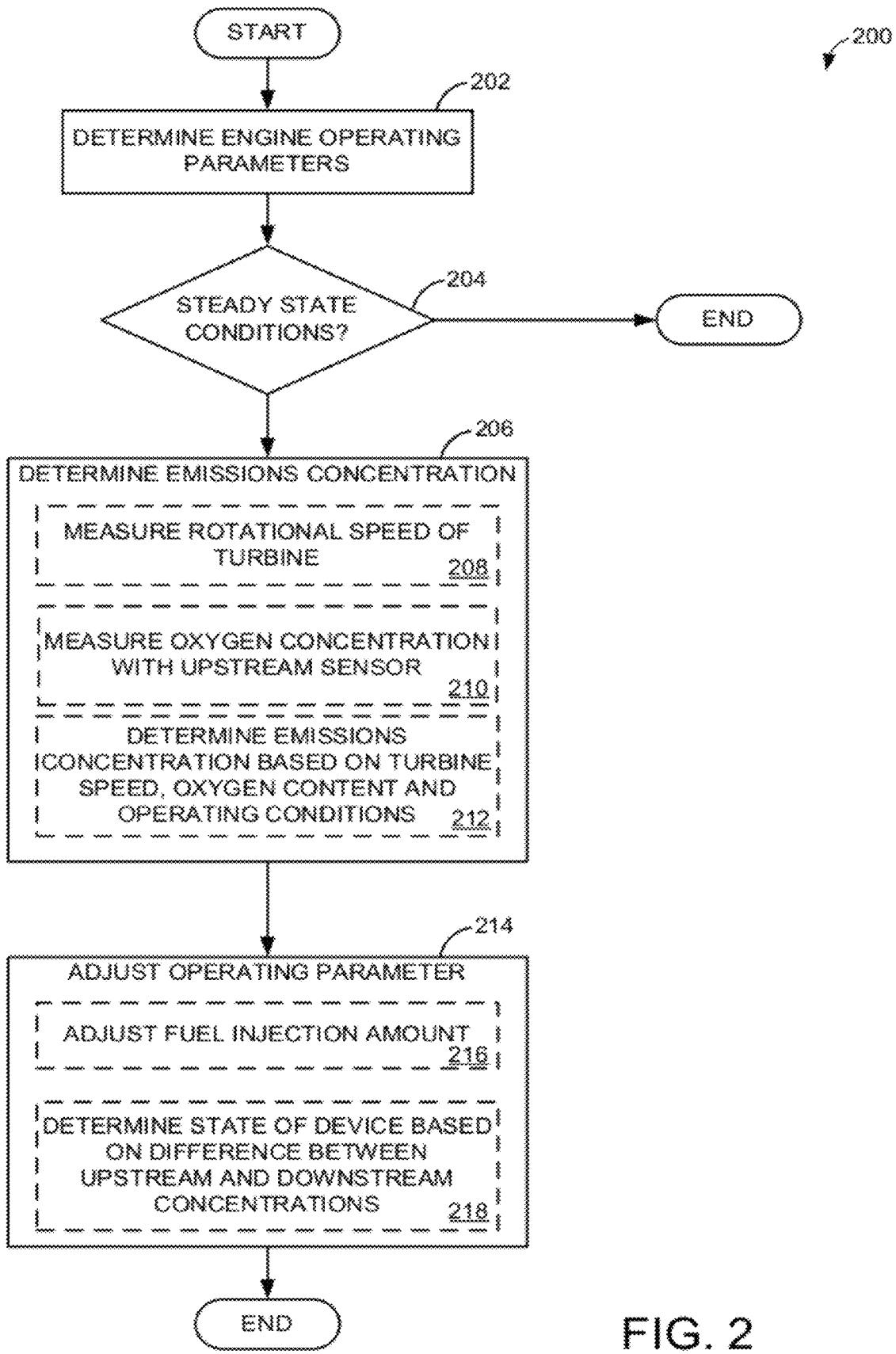
FIG. 2 shows a flow chart illustrating a method for determining emission concentration according to an embodiment of the present disclosure.
Figure 3:
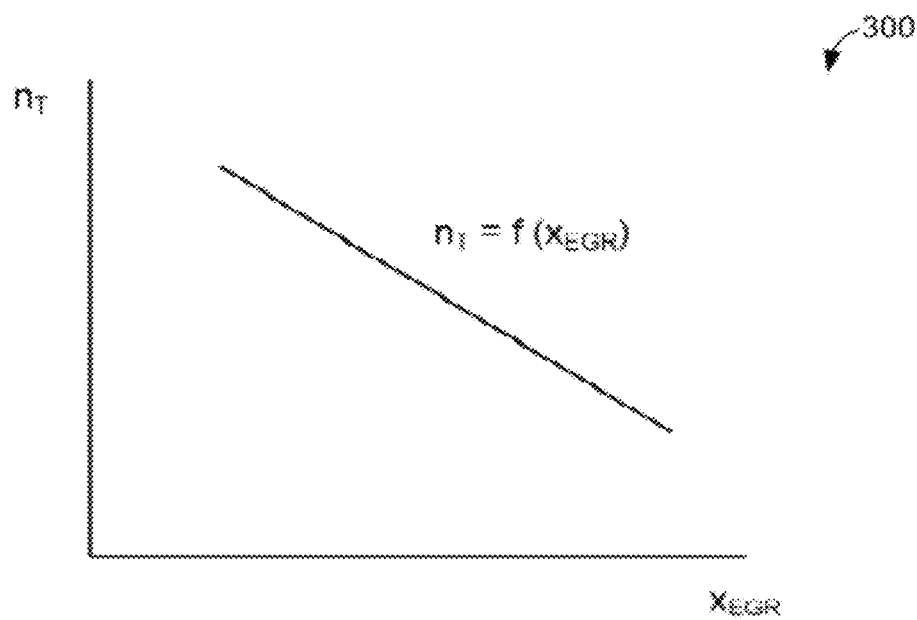
FIG. 3 shows, in a diagram, the rotational speed of the charger versus the EGR recirculation rate.
Figure 4:
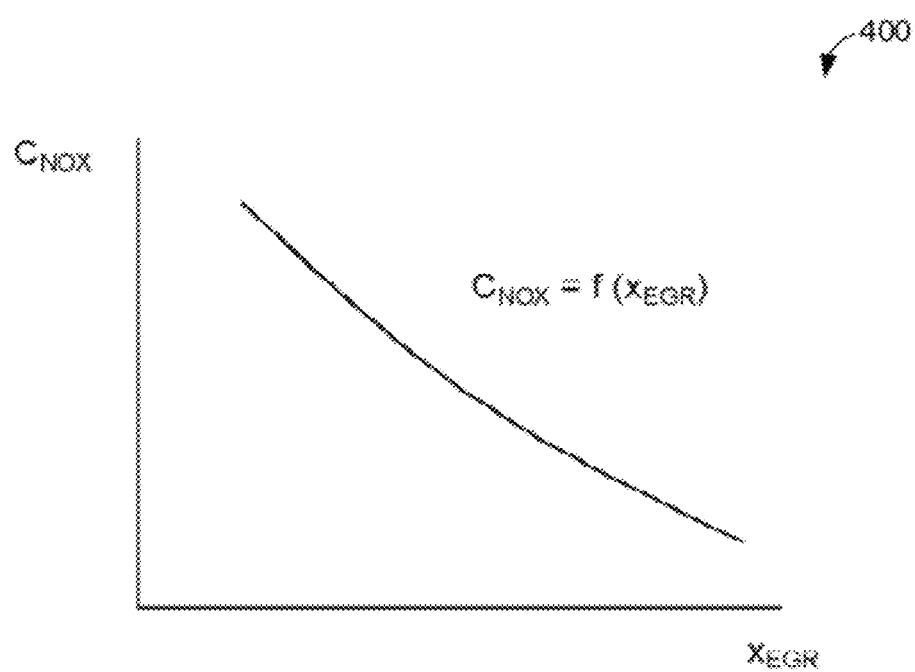
FIG. 4 shows, in a diagram, the concentration of nitrogen oxides in the exhaust gas versus the EGR recirculation rate.
Figure 5:
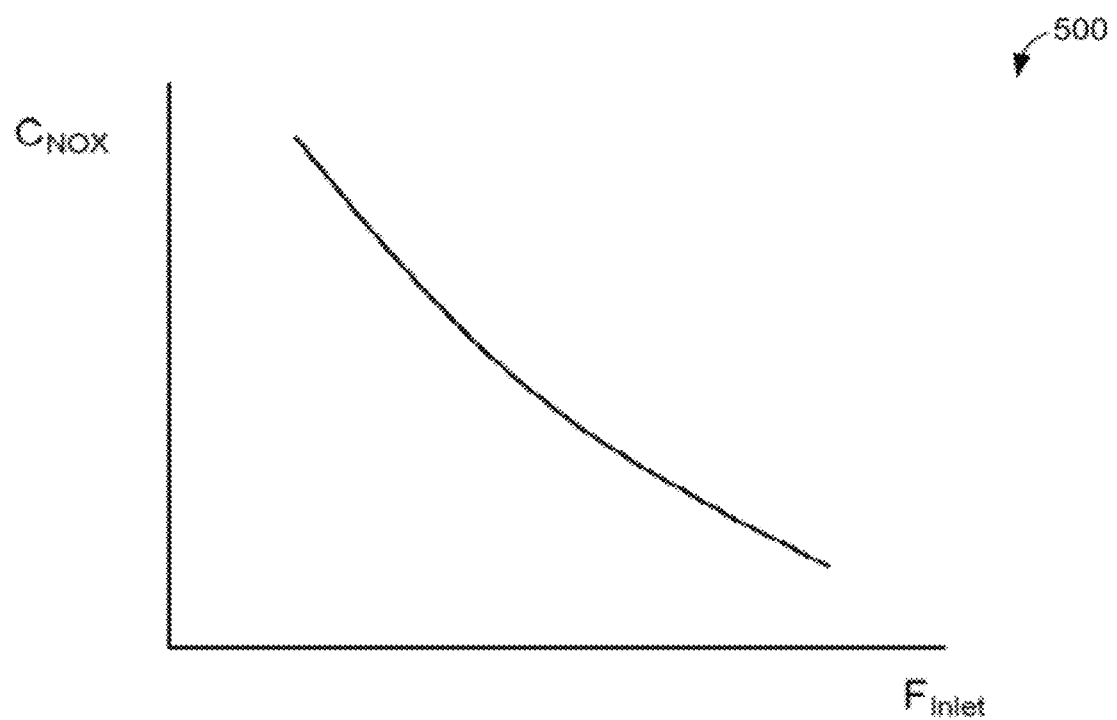
FIG. 5 shows, in a diagram, the concentration of nitrogen oxides in the exhaust gas versus the fraction of combustion products in the cylinder fresh charge.

Determination of emissions in the exhaust of engines may be made by one or more exhaust gas sensors, which measure the oxygen concentration of the exhaust that is then used to calculate an air-fuel ratio of the exhaust. The mass flow of exhaust through the exhaust passage and/or through an exhaust aftertreatment device may be used in the calculation of the air-fuel ratio. However, many engines include an exhaust gas recirculation (EGR) system, which diverts a portion of the exhaust gas back to the intake in order to improve fuel economy and emissions production. This may confound the calculation of the air-fuel ratio by disturbing the mass air flow. The rotational speed of a turbine positioned in the exhaust stream may be used as a parameter to estimate the portion of the exhaust that is diverted by the EGR system, as the speed of the turbine is directly proportional to the mass flow of the exhaust. Thus, the air-fuel ratio and/or emission concentration of the exhaust may be more accurately determined. FIG. 1 shows an example engine diagram including and EGR system and a turbocharger. FIG. 2 is an example control routine that may be carried out by the engine of FIG. 1 in order to determine an emission concentration. FIGS. 3-5 are diagrams depicting the relationships between various factors used in the control routine of FIG. 2.

FIG. 1 schematically shows an internal combustion engine 1, which may be used to carry out one or more methods disclosed herein. The internal combustion engine 1 has an intake system 3 for supplying fresh air or fresh mixture to the cylinders 10 and has an exhaust-gas discharge system 2 by which the exhaust gases are discharged from the cylinders 5. While engine 1 is depicted in the embodiment of FIG. 1 as including three cylinders arranged in line, any number of cylinders in any arrangement is in the scope of this disclosure.

For the boosting of the internal combustion engine 1, an exhaust-gas turbocharger 6 is provided which has a compressor 6a arranged in an intake line of the intake system 3 and which has a turbine 6b arranged in an exhaust line of the exhaust-gas discharge system 2, which compressor and turbine are mounted on the same shaft. An exhaust-gas aftertreatment system 9 is provided downstream of the turbine 6b. In some embodiments, the device may be a storage catalytic converter, that may store and then later break down the emissions in the exhaust into less toxic products.

An advantage of the exhaust-gas turbocharger in relation to a mechanical charger is that no mechanical connection for transmitting power exists or is required between the charger and internal combustion engine. While a mechanical charger extracts the energy used for driving it entirely from the internal combustion engine, and thereby reduces the output power and consequently adversely affects the efficiency, the exhaust-gas turbocharger utilizes the exhaust-gas energy of the hot exhaust gases.

In some embodiments, a charge-air cooler (not shown) may be provided downstream of the compressor, the charge-air cooler configured to cool the compressed combustion air before it enters the cylinders.

Furthermore, the internal combustion engine 1 is equipped with an exhaust-gas recirculation system 4 comprising a recirculation line 5 which branches off from the exhaust-gas discharge system 2 upstream of the turbine 6b and which opens out into the intake system 3. In embodiments in which a charge-air cooler is provided, the cooler may be provided in the recirculation line, such that the cooler may cool the recirculated exhaust gas.

Upstream of the turbine 6b, a lambda probe 7 is provided in the exhaust-gas discharge system 2 to measure the air ratio $\lambda_{meas}$. The composition of the recirculated exhaust gas can be inferred from the air ratio $\lambda_{meas}$. The air ratio $\lambda_{meas}$ serves for determining and specifying the proportion of the exhaust-gas fraction $F_{Outlet}$ resulting from the combustion. An additional lambda probe 11 may be provided downstream of an emission control device in order to evaluate the functionality of the control device, as explained in greater detail below.

Engine 1 may receive control parameters from a control system including controller 12. Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 1, such as sensors 7 and 8. Controller 12 may sent signals to various actuators of the engine 1, including one or more valves (not shown) of the EGR system, and a fuel system 14. For example, fuel system 14 may include a fuel tank, fuel pump, fuel line, and multiple injection nozzles, to introduce fuel to the cylinders 10. Controller 12 may send signals to control the amount of fuel introduced to the cylinders, based on feedback from sensor 7, for example. Any type of fuel may be introduced to the cylinders, including gasoline, diesel, ethanol, or mixtures thereof. It is to be understood that the engine 1 may include a variety of valves and sensors not illustrated in FIG. 1.

The rotational speed $n_T$ of the exhaust-gas turbocharger 6 is measured by a sensor 8 and correlated with the recirculation rate $x_{EGR}$. The emission concentration C, may be determined using the air ratio $\lambda_{meas}$ and the rotational speed $n_T$, according to the relationship $C_i = f(\lambda_{meas}, n_T)$.

During steady-state operation of the internal combustion engine, the concentration $C_i$ of an emissions component i in the exhaust gas is significantly dependent on the composition of the cylinder fresh charge, that is to say—assuming equal amounts of fuel—on the composition of the gas proportion of the cylinder fresh charge and therefore on the recirculation rate $x_{EGR}$ and the composition of the recirculated exhaust gas, which can be described by the proportion of the exhaust-gas fraction $F_{Outlet}$ resulting from the combustion, which in turn can be determined using the air ratio $\lambda_{meas}$ in the exhaust system. The following relationship applies:

$$F_{Outlet} \sim \lambda_{meas}^{-1}$$

For example, if a stoichiometric combustion is taking place with $\lambda_{meas} = \lambda_{stoich} = 1$, then $F_{Outlet} = 1$ because the entirety of the exhaust gas falls within the fraction resulting from the combustion, that is to say the entirety of the exhaust gas is formed from combustion products. In other words, the entirety of the cylinder fresh charge is chemically converted during the course of the combustion, with the oxygen in the air being completely consumed.

With regard to the recirculation rate $x_{EGR}$, the method according to the disclosure utilizes the effect conventionally known, and inevitably encountered in an internal combustion engine which is supercharged by exhaust gas turbocharging and in which exhaust gas is branched off upstream of the turbine for the purpose of recirculation, which is manifested in that the exhaust-gas mass flow conducted through the turbine of the exhaust-gas turbocharger decreases with increasing exhaust-gas recirculation rate. The decreasing mass flow through the turbine leads to a decrease in the turbine rotational speed $n_T$, that is to say to a decreasing rotational speed of the charger.

There is thus a relationship between the recirculation rate $x_{EGR}$ and the rotational speed $n_T$ of the turbine, which relationship is utilized according to the disclosure. The following relationship applies:

$$n_T \sim x_{EGR}^{-1}$$

While the recirculation rate $x_{EGR}$ cannot be ascertained per se from a direct measurement, the rotational speed $n_T$ of the exhaust-gas turbocharger can be measured by a sensor, such as sensor 8.

From that which has been stated above, it follows that the emission concentration $C_i$ in the exhaust gas can be determined using the air ratio $\lambda_{meas}$ and the rotational speed $n_T$. The following relationship applies:

$$C_i = f(\lambda_{meas}, n_T).$$

Consequently, by use of an example method according to the disclosure, described below with respect to FIG. 2, the concentration $C_i$ of an emission component in the exhaust gas of the internal combustion engine can be determined and monitored.

Since the air ratio $\lambda_{meas}$ serves to describe or specify the composition of the recirculated exhaust gas, it is advantageous for no exhaust-gas aftertreatment system to be provided between the probe and the recirculation line. The lambda probe may be arranged at a location in the exhaust-gas discharge system, though may basically also be arranged in the recirculation line.

Turning to FIG. 2, a method 200 for determining an emission concentration is provided. Method 200 may be carried out by a control system, such as controller 12, using signals received from components of the engine system described above with respect to FIG. 1. Method 200 comprises, at 202, determining engine operating parameters. The engine operating parameters may include engine speed, load, temperature, ambient pressure, humidity, torque, etc. Method 200 comprises determining if the engine is operating under steady state conditions at 204. The engine operating parameters determined at 202 may be monitored over a predetermined amount of time, such as one second, ten seconds, etc. If particular operating parameters, such as speed and load, are constant during the predetermined time period, or if they fluctuate by less than a threshold amount, the engine may be operating under steady state conditions. However, if they do not remain constant, or if they vary by more than a threshold amount, the engine may not be operating under steady state conditions.

If it is determined at 204 that the engine is not operating under steady state conditions, method 200 ends. Said approach reduces or eliminates the influence of other operating parameters on the respective emission concentration, and thereby ensures that a change in the emission concentration is attributable to a modification of the recirculation rate $x_{EGR}$ and an associated change in rotational speed $n_T$, as described below, and not to a variation of other parameters such as for example the fuel pressure, the start of injection, the injection duration, the injection quantity and/or the like. In one embodiment, steady state condition may be determined by at least two operating parameters, including the engine speed n and the load of the internal combustion engine. In other embodiments, the at least two operating parameters may include the engine speed n and the torque T of the internal combustion engine.

If it is determined at 204 that the engine is operating under steady state conditions, method 200 proceeds to 206 to determine an emission concentration. The emission concentration may be determined upstream of an exhaust aftertreatment device, such as device 9, downstream of the device, or both. The emission may be any emission produced by an engine and subject to regulated release, such as NOx, CO, etc. Determining the emission concentration includes determining the rotational speed of a turbine positioned in the exhaust stream by a turbine speed sensor at 208, such as turbine 6b and speed sensor 8. The air/fuel ratio of the exhaust upstream of the device may be determined at 210 using an oxygen sensor, such as sensor 7. At 212, the emission concentration may be determined based on the rotational speed of the turbine and the air/fuel ratio of the exhaust, and further based on operating condition-specific parameters, such as speed, load, torque, ambient pressure, temperature, humidity, and flow delay of the exhaust stream.

The emission concentration, $C_i$, may be determined based on a regression model. The regression model may be based on the equation:

$$C_i(n,T) = [a_0(n,T) + b_1(n,T)*n_T + b_2(n,T)*\lambda_{meas}^{-1} + c_3(n,T)*n_T*\lambda_{meas}^{-1}],$$

where $a_0, b_1, b_2$ and $c_3$ denote operating-point-specific constants. These operating-point-specific constants may be values that are determined in an off-line regression analysis of previously-collected experimental data, and may be stored in one or more maps on the controller, and may be specific to engine speed and torque, or engine speed and load, for example.

The equation may be expanded as desired, specifically to include terms of higher power. The following relationship applies:

$$C_i(n,T) = [a_0(n,T) + b_1(n,T)*n_T + b_2(n,T)*\lambda_{meas}^{-1} + c_3(n,T)*n_T*\lambda_{meas}^{-1} + \ldots]$$

The concentration $C_{NOX}$ of the nitrogen oxides $NO_x$ may be determined by the equation:

$$C_{NOX}(n,T) = [a_0(n,T) + b_1(n,T)*n_T + b_2(n,T)*\lambda_{meas}^{-1} + c_3(n,T)*n_T*\lambda_{meas}^{-1}],$$

where $a_0, b_1, b_2$ and $c_3$ denote operating-point-specific constants, as explained above.

In some embodiments, one or more operating parameters may be adjusted based on the emission concentration at 214. This includes adjusting a fuel injection amount to one or more cylinders of the engine at 216. Undesired emission concentration may be due to rich or lean cylinder charge conditions, and the fuel injection amount may be adjusted to bring the air/fuel ratio closer to stoichiometry, for example.

The functionality, or degradation state, of the exhaust aftertreatment device may be determined at 218 by determining the emission concentration both upstream $C_{i,up}$ and also downstream $C_{i,down}$ of the exhaust-gas aftertreatment system. The two concentrations may be compared to each other at 218, and a difference between them may be used to determine the degradation state of the device. For example, if the two concentrations $C_{i,up}$ and $C_{i,down}$ are substantially equal, the exhaust-gas aftertreatment system may be non-functional, as it indicates the device is not removing the emissions from the exhaust stream. However, if the difference between the two concentrations is greater than a threshold amount, it may indicate a functional device. Upon adjusting an operating parameter, method 200 ends.

Thus, method 200 may provide for a more accurate determination of emissions in the exhaust as a function of the proportion of exhaust diverted to the EGR system, based on a rotational speed of the turbine, an air/fuel ratio of the exhaust, and one more operating parameters such as speed and load. This can be used to determine the functionality of an aftertreatment device in the exhaust. In one example, if degradation of the catalyst is indicated, an operator of the engine may be notified to replace the catalyst. In other examples, various engine operating parameters may be adjusted to compensate for the degraded catalyst, such as more frequent regeneration events, increased reductant (e.g. unburnt hydrocarbons) introduced to the catalyst, etc. As the emission concentration is based in part on the air/fuel ratio of the exhaust, this air/fuel ratio may be used to adjust a fuel injection amount to the cylinders of the engine, if it deviates from desired air/fuel ratio for the current operating conditions.

FIG. 3 shows, in a diagram 300, the rotational speed $n_T$ of the charger versus the recirculation rate $x_{EGR}$. In the case of an internal combustion engine which is supercharged by a turbocharger and in which exhaust gas is extracted upstream of the turbine for the purpose of recirculation, the exhaust-gas flow conducted through the turbine of the charger decreases with increasing recirculation rate. The decreasing mass flow through the turbine causes a reduction in the turbine rotational speed $n_T$. The rotational speed $n_T$ of the turbine is inversely proportional to the recirculation rate $x_{EGR}$, where $n_T \sim x_{EGR}^{-1}$.

FIG. 4 shows, in a diagram 400, the concentration $C_{NOX}$ of nitrogen oxides in the exhaust gas versus the recirculation rate $x_{EGR}$. The recirculation of exhaust gases from the exhaust-gas side to the intake side via a recirculation line is a measure for reducing the nitrogen oxide untreated emissions, wherein the nitrogen oxide concentration $C_{NOX}$ in the exhaust gas decreases with increasing exhaust-gas recirculation rate. The nitrogen oxide concentration $C_{NOX}$ is inversely proportional to the recirculation rate $x_{EGR}$, where $C_{NOX} \sim x_{EGR}^{-1}$.

FIG. 5 shows, in a diagram 500, the concentration $C_{NOX}$ of nitrogen oxides in the exhaust gas versus $F_{Inlet}$, the fraction of combustion products in the cylinder fresh charge. If the proportion of combustion products in the cylinder fresh charge increases, that is to say $F_{Inlet}$ increases, the nitrogen oxide concentration $C_{NOX}$ in the exhaust gas falls. In other words, $F_{Inlet}$ may include the relative portion of the air charge in the combustion cylinders that comes from the EGR system, e.g., the percentage of EGR in the total cylinder charge.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring a regulated emission concentration (Ci) in the exhaust gas of an internal combustion engine, comprising:

directing the exhaust gas through an exhaust-gas turbocharger;

directing at least a portion of the exhaust gas through an exhaust-gas recirculation (EGR) system;

measuring an air ratio ($\lambda$meas) in the exhaust gas with a lambda probe;

measuring a rotational speed (nT) of the exhaust-gas turbocharger with a sensor;

estimating the portion of the exhaust gas directed through the exhaust-gas recirculation system based on the rotational speed (nT) of the exhaust gas turbocharger; and determining the regulated emission concentration (Ci) based on the air ratio ($\lambda$meas) and the estimated portion of the exhaust gas.

2. The method as claimed in claim 1, wherein the regulated emission concentration (Ci) is determined in steady-state operation of the internal combustion engine at a fixed operating point characterized by at least two operating parameters.

3. The method as claimed in claim 2, wherein the at least two operating parameters comprise the rotational speed (nT) and a load of the internal combustion engine.

4. The method as claimed in claim 2, wherein the at least two operating parameters comprise a rotational speed (n) and a torque (T) of the internal combustion engine.

5. The method as claimed in claim 1, wherein the regulated emission concentration (Ci) is determined based on a regression model including coefficients dependent upon operating points.

6. The method as claimed in claim 5, wherein the coefficients are stored in at least one characteristic map, with each characteristic map being assigned to a particular operating point.

7. The method as claimed in claim 1, wherein the regulated emission concentration (CNOx) of nitrogen oxides (NOx) is determined.

8. The method as claimed in claim 1, wherein functionality of an exhaust-gas aftertreatment system may be determined based on the regulated emission concentration.

9. The method as claimed in claim 8, wherein the exhaust-gas aftertreatment system is a storage catalytic converter.

10. A method for determining NOx concentration in an exhaust stream of an engine, comprising:

estimating an exhaust gas recirculation (EGR) amount based on a turbine rotational speed;

estimating NOx concentration based on the estimated EGR amount and an upstream exhaust air-fuel ratio, and further based on current operating conditions; and adjusting an engine operating parameter responsive to the estimated NOx concentration.

11. The method of claim 10, wherein the estimated NOx concentration is further based on engine speed and load.

12. The method of claim 10, wherein the estimated NOx concentration is further based on one or more of ambient pressure, temperature, humidity, and flow delay of the exhaust stream.

13. The method of claim 10, further comprising:

if engine speed and load remain constant over a predetermined period of time, then adjusting the engine operating parameter responsive to the estimated NOx concentration; and if engine speed and load vary by a threshold amount over the predetermined period of time, then not adjusting the operating parameter responsive to the estimated NOx concentration.

14. The method of claim 10, wherein adjusting the operating parameter responsive to the estimated NOx concentration further comprises adjusting a fuel injection amount into one or more cylinders of the engine.

15. The method of claim 10, wherein the estimated NOx concentration is a first NOx concentration, and further comprising adjusting an operating parameter responsive to a difference between the first NOx and concentration and a second NOx concentration, the second NOx concentration based on the estimated EGR amount and an air-fuel ratio downstream of an exhaust aftertreatment device.

16. The method of claim 10, wherein adjusting the operating parameter responsive to the estimated NOx concentration further comprises sending a notification to a vehicle operator to replace an exhaust aftertreatment device.

17. A system comprising:

an engine;

a turbine arranged in an exhaust stream downstream of the engine;

an exhaust gas recirculation (EGR) system upstream of the turbine to direct at least a portion of the exhaust stream back to the engine; and a controller having instructions executable to:

estimate an amount of EGR directed to the engine based on a rotational speed of the turbine; and adjust an operating parameter responsive to an emissions concentration, the emissions concentration based on the amount of EGR and an upstream exhaust air-fuel ratio, and further based on current operating conditions.

18. The system of claim 17, wherein the rotational speed of the turbine is inversely proportional to the portion of the exhaust stream diverted through the exhaust gas recirculation system upstream of the turbine.

19. The system of claim 17, wherein the instructions are executable to determine an NOx concentration of the exhaust, and wherein the NOx concentration of the exhaust is inversely proportional to the portion of the exhaust stream diverted through the EGR upstream of the turbine.

20. The system of claim 17, wherein the instructions are further executable to determine a degradation state of an exhaust aftertreatment device arranged in the exhaust stream based on the emissions concentration, and a second emissions concentration downstream of the exhaust aftertreatment device.

* * * * *